July 10, 1923.
L. M. QUÉMARD
HOSE CLAMP
Filed April 21, 1921
1,461,290
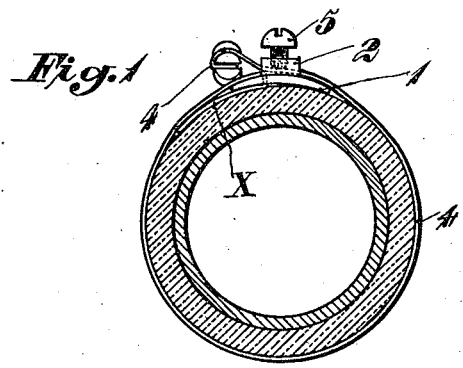
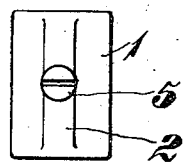 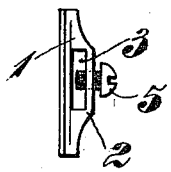
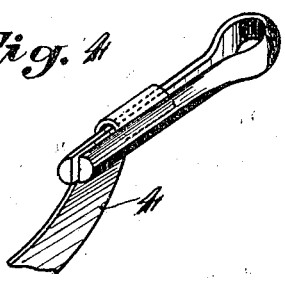
Inventor.
Lucien Marcel Quémard
By B. Singer
Atty.

Patented July 10, 1923.

1,461,290

UNITED STATES PATENT OFFICE.

LUCIEN MARCEL QUÉMARD, OF ROYAN, FRANCE.

HOSE CLAMP.

Application filed April 21, 1921. Serial No. 463,289.

(GRANTED UNDER THE PROVISIONS OF THE ACT OF MARCH 3, 1921, 41 STAT. L., 1313.)

*To all whom it may concern:*

Be it known that LUCIEN MARCEL QUÉMARD, a citizen of the Republic of France, residing at Royan, Avenue de Pontaillac, France, has invented certain new and useful Improvements in Hose Clamps (for which I have filed application for patent in France April 7, 1920), and does hereby declare the following to be a full, clear, and exact description of the invention, such as will enable others skilled in the art to which it appertains to make and use the same.

This invention relates to a collar for crimping rubber hose and the said collar is of absolutely universal use, since designed to fit very readily all sizes of pipes even if the diameter of the rubber hose is over large, as it will then shrink the said hose and so prevent any water leakage through the crimping.

A collar constructed according to this invention involves no rivet and once mounted offers a minimum of projections. It can be removed and put on again a great many times without requiring any attention. Moreover all sorts of band, sheet iron or any other material can be used with it.

The said collar consists of three parts, members or elements: The main member, which is called a crimping loop has a clamping screw and is provided with two small bars for the passage of the sheet steel band which is to tighten on the rubber hose. The crimping is achieved by means of a split pin round which the band is wound so as to obtain a gradual tightening of the rubber hose on the metal pipe.

This invention is illustrated by the appended drawing wherein:

Fig. 1 is a side view of the complete collar.

Fig. 2 a plane view of the crimping loop.

Fig. 3 a side elevation of the loop.

Fig. 4 is a perspective view of the split pin.

Referring now particularly to the drawing, 1 is the crimping loop the bulging part 2 of which is press-punched and somewhat stamped in order to leave a passage 3 for the sheet steel band 4. Loop 1 is sufficiently bent to be able to fit on pipes of any diameter and is provided with a screw 5 intended to afford additional tightening and locking means for locking the band once the crimping has been completed.

The mounting of a collar constructed according to this invention is operated as follows:

Screw 5 is first loosened right up so that its tip will not protrude inside the bulging part 2 in order not to obstruct the passage of band 4. One of the ends X of the band 4 is then introduced into the loop and allowed to go one or two inches beyond a carding to the size of the joint to be crimped; this end is then finger-folded underneath, and if desired, this fold can be flattened with any pinchers or pliers so as to leave a free passage for the other end of the band.

The collar is now ready and has but to be fixed on the hose, and then the second end of the band inserted in the loop. The extra length of band is to be cut off, leaving, once the collar is mounted, only a bit about 6 to 8 inches long from the screwhead to protrude.

In order to tighten the band of the rubber hose, the free end of the band is placed in a split pin with an allowance of about $\frac{3}{32}$ds. of an inch beyond.

By means of a pinsetter or of any sort of punch inserted in the eye of the pin, the latter is rotated in the direction indicated by the arrow until quite tight. The tightening is effectuated by the winding of the band on the pin, the latter bearing against the loop and forcing the band to crimp the rubber hose on the metal tube and thus make the joint. Once the tightening has been completed, the band is locked by screwing home the screw 5. When the screw 5 exerts its pressure on the band, the pin can be withdrawn since henceforth useless, and the end of the band filed off or cut with any sort of sheers or nippers almost flush with the loop, a collar with as little projection as possible being thus obtained.

It must be understood that the embodiment of this invention described and illustrated in and by this specification and drawing can be modified in many respects as to form, shape, size, proportion and material according to the various diameters of the hose and pipes to be crimped, and that it is not intended to limit to the said embodiment the scope of this invention, but it is desired that the Letters Patent covers whatever can be fairly considered as not departing from its principle and purpose.

Claims—

1. In a collar for crimping rubber hose on metal pipes, a base plate bent to lie against the circumference of the rubber hose, an arched loop on said base plate, a band, means to attach the one end of said band to the said base plate, a passage on the said loop for the other end of the band, means to tighten the band on the base plate, and a screw in the loop to lock the band against the base plate after tightening.

2. In a collar for crimping rubber hose on metal pipes, a base plate bent to lie against the circumference of the rubber hose, an arched loop on said base plate, a band, a fold on the one end of the band to attach the same to the said base plate, a passage in the said loop for the other end of the band, a split pin to tighten the band on the base plate, and a screw in the loop for locking the band against the base plate after tightening.

In testimony whereof I affix my signature in presence of two witnesses.

LUCIEN MARCEL QUÉMARD.

Witnesses:
SIMONE GUIBAUD,
HENRIETTE CAZEAUX.